United States Patent
Russ et al.

[11] Patent Number: 6,061,604
[45] Date of Patent: May 9, 2000

[54] RF BASE REPEATER FOR AUTOMATED RESIDENCE MANAGEMENT SYSTEM

[75] Inventors: Robert M. Russ, Los Altos Hills, Calif.; William W. Bassett, Wheaton, Ill.; Charles A. Glorioso, Castro Valley, Calif.

[73] Assignee: Gas Research Institute, Chicago, Ill.

[21] Appl. No.: 08/852,102

[22] Filed: May 6, 1997

[51] Int. Cl.[7] ................................................. G06F 19/00
[52] U.S. Cl. .................................... 700/90; 340/825.52
[58] Field of Search ........................ 340/825.52; 700/90

[56] References Cited

U.S. PATENT DOCUMENTS

| | | | |
|---|---|---|---|
| 3,881,325 | 5/1975 | Repay et al. | 464/36 |
| 4,310,896 | 1/1982 | Cutler et al. | 395/285 |
| 4,360,881 | 11/1982 | Martinson | 364/528.3 |
| 4,389,577 | 6/1983 | Anderson et al. | 307/39 |
| 4,421,268 | 12/1983 | Bassett et al. | 236/10 |
| 4,508,261 | 4/1985 | Blank | 236/20 R |
| 4,519,540 | 5/1985 | Boulle et al. | 237/7 |
| 4,567,557 | 1/1986 | Burns | 364/145 |
| 4,607,787 | 8/1986 | Rogers, III | 236/11 |
| 4,644,320 | 2/1987 | Carr et al. | 340/310.06 |
| 4,703,306 | 10/1987 | Barritt | 340/310.08 |
| 4,799,059 | 1/1989 | Grindahl et al. | 330/257 |
| 4,819,180 | 4/1989 | Hedman et al. | 364/528.26 |
| 4,888,706 | 12/1989 | Rush et al. | 364/528.18 |
| 5,032,833 | 7/1991 | Laporte | 340/825.02 |
| 5,056,107 | 10/1991 | Johnson et al. | 375/203 |
| 5,073,862 | 12/1991 | Carlson | 702/185 |
| 5,126,934 | 6/1992 | MacFadyen | 364/140.01 |
| 5,168,170 | 12/1992 | Hartig | 307/35 |
| 5,186,386 | 2/1993 | Lynch | 236/11 |
| 5,270,704 | 12/1993 | Sasa Quintana et al. | 340/870.02 |
| 5,323,307 | 6/1994 | Wolf et al. | 364/140.05 |
| 5,350,114 | 9/1994 | Nelson et al. | 237/2 A |
| 5,528,621 | 6/1996 | Heiman et al. | 375/200 |
| 5,533,025 | 7/1996 | Fleek et al. | 370/445 |
| 5,572,438 | 11/1996 | Ehlers et al. | 364/528.3 |
| 5,706,191 | 1/1998 | Bassett et al. | 364/138 |
| 5,726,644 | 3/1998 | Jednacz et al. | 340/825.52 |

FOREIGN PATENT DOCUMENTS

| | | |
|---|---|---|
| 0620631 | 10/1994 | European Pat. Off. . |
| WO9612993 | 5/1996 | WIPO . |

*Primary Examiner*—William Grant
*Assistant Examiner*—Chad Rapp
*Attorney, Agent, or Firm*—Pauley Petersen Kinne & Fejer

[57] ABSTRACT

A multi-unit automated space management and communication system for use in association with a structure having a plurality of units. The system includes circuitry that monitors various utility related aspects of each of the plurality of units. The system further includes an automated subsystem disposed in each one of the plurality of units. This subsystem includes at least one appliance, at least one communication medium means, at least one interface means for connecting the at least one appliance apparatus into a signal exchanging relationship with the at least one communication medium means, at least one communication source, operably connected to the at least one communication medium means. The system further includes an external communication interface linking the automated subsystem to the monitoring means in a signal-exchanging relationship. The system still further includes data storage circuits.

9 Claims, 3 Drawing Sheets

| 424 BITS | 4 | 4 | 16 | 16 | 8 | 16 | 16 |
|---|---|---|---|---|---|---|---|
| ACQ PREAMBLE | SPC | CTRL | BASE ADDR | REMOTE ADDR | LEN | HOP SEQ | CHK SUM |

FIG. 5

| 64 BITS | 4 | 4 | 16 | 16 | 8 | O-MAX | 16 |
|---|---|---|---|---|---|---|---|
| NORMAL PREAMBLE | SPC | CTRL | BASE ADDR | REMOTE ADDR | LEN | DATA | CHK SUM |

FIG. 6

RF BASE REPEATER FOR AUTOMATED RESIDENCE MANAGEMENT SYSTEM

BACKGROUND OF THE INVENTION

1. Field of the Invention

The present invention relates generally to automation systems for connecting appliances, such as computers, stoves, refrigerators, water heaters, and the like, and systems, such as residential heating, ventilation and air conditioning (HVAC) systems, in communication and/or in controlling relationships with one another, and with a central control device, such as a programmable microprocessor, in order to enable all such appliances and systems in a plurality of residences and other spaces to operate in a centrally controlled manner. The present invention also relates to devices and methods for enabling the systems deployed within each of the plurality of residences and other spaces to communicate with local interfaces systems.

2. Background Art

Private homes, apartment buildings, office buildings, and other occupied spaces and structures are becoming more and more regulated by electronic systems. For example, many, if not most of the appliances which are located in a modern home, such as a furnace or spa pool heater, and many of the basic mechanical systems, such as an HVAC system, are electronically controlled, by dedicated control devices, such as programmable microprocessors, situated within the specific device or system. It is already well known for homes to have sophisticated electronic automation systems, which may include electronic security and surveillance systems, systems for controlling and scheduling the operation of the home's HVAC system, a lawn sprinkler system, exterior and interior lighting, and so on. In co-pending application Ser. No. 08/375,481 assigned to the same assignee as the present application, it is taught that these various appliances or systems can be interconnected to facilitate maintenance and operation of the residence in a more convenient and efficient manner. The system taught in that co-pending application is limited to facilitate maintenance and operation of a single residence.

It would be desirable to provide a system that provides limited communication, monitoring and control for a plurality of associated residences and other spaces, referred to as "units," such as found in apartment buildings, hospitals, hotels, motels, nursing homes, residence halls and similar multi-unit structures.

It also would be desirable to provide for the connection between various appliances in various units of such multi-unit structures, which would also permit various diagnostic and analysis functions to be conducted, and communicated to a user/operator, so as to be able, for example, to inform the user/operator of an actual or anticipated failure in a component, or to inform the user of past performance or power consumption, and even possibly make projections of expected performance.

It would also be desirable to provide a method and apparatus which would enable the entire multi-unit structure to communicate with locations remote from the structure.

It would still further be desirable to provide a method and apparatus for bringing home appliances and mechanical systems, such as gas-fired appliances and HVAC systems, into communication with and into a control relationship a central control unit.

SUMMARY OF THE INVENTION

The invention comprises a multi-unit automated space management and communication system. The system is used in association with a structure having a plurality of units, such as an apartment dwelling.

The system comprises a monitoring structure, an automated subsystem, an external communication interface and a structure for storing data. The monitoring structure monitors various utility related aspects of the units. The subsystem includes an appliance apparatus in the unit, and structures capable of generating signals representative of the appliance apparatus and an interface. The various subsystems are linked to the monitoring structure by way of an external communication interface. The data storing structure stores the data associated with the subsystems of each one of the units.

In a preferred embodiment, the system further includes a structure for controlling the appliances in each one of the units. In such a preferred embodiment, the system further includes a structure for receiving commands from a utility company. In another such preferred embodiment, the system further includes a user interface that allows the user to access the data in the data storage structure.

The invention further comprises an apparatus for identifying an undesirable condition in at least one unit of a multi-unit group. Each unit of the multi-unit group includes at least a first-type device having operating parameters. The apparatus includes a monitoring structure, a structure for gathering information from the monitoring structure and a structure for identifying the undesirable condition in the unit of the multi-unit structure.

In a preferred embodiment, the apparatus further includes a structure for controlling the operating parameters of the first-type device in response to the identification of the undesirable condition.

In another preferred embodiment, the apparatus further includes a structure for receiving notification of the undesirable condition from a utility company.

BRIEF DESCRIPTION OF THE DRAWINGS

FIG. 5 of the drawings is a diagram of an acquisition communication packet; and

FIG. 6 of the drawings is a diagram of a normal communication packet.

BEST MODE FOR PRACTICING THE INVENTION

Figure 1:
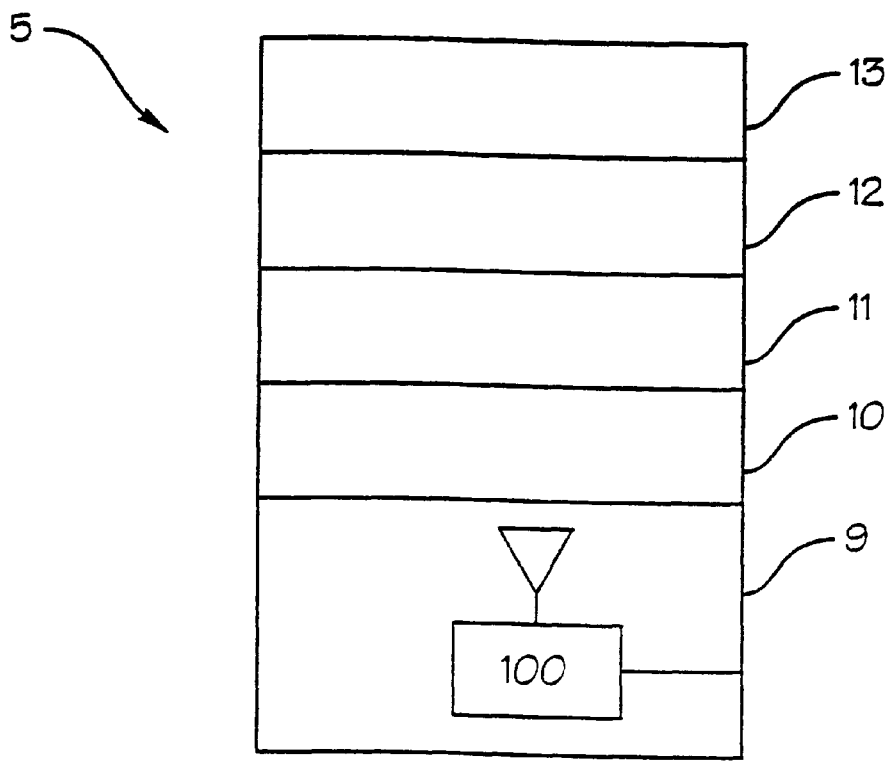
FIG. 1 of the drawings is a schematic representation of a multi-unit structure.

While this invention is susceptible of embodiment in many different forms, there is shown in the drawings and will be described herein in detail, several specific embodiments, with the understanding that the present invention is to be considered as an exemplification of the principles of the invention and is not intended to limit the invention to the embodiments illustrated.

FIG. 1 represents an embodiment of the present invention, schematically illustrating a multi-unit structure 5 having a plurality of units 9, 10, 11, 1 2 and 13. While these units are depicted as being on separate floors of a structure, the plurality of units can be configured in any manner, such as multiple units on multiple floors, such as in an apartment building or hotel. Furthermore, it is contemplated that linking every unit of a multi-unit structure would not be necessary or desirable, thus, for purposes of the present application, such units are ignored and not considered part of the plurality of units.

Accordingly, a structure-wide automation system is created by providing desired ones of the plurality of units with a respective self-contained unit controller and associated system components, as will be described hereinbelow, and providing one unit associated with the structure with a central controller. As shown in FIG. 1, central controller 100 is disposed within unit 9 of multi-unit structure 5. Unit 9 of multi-unit structure 5 can be thought of as an office, control center, or janitor's apartment. As will be explained further, central controller 100 allows building personnel to monitor (and in various instances control) specific aspects of multi-unit structure 5 from a central location.

Figure 2:
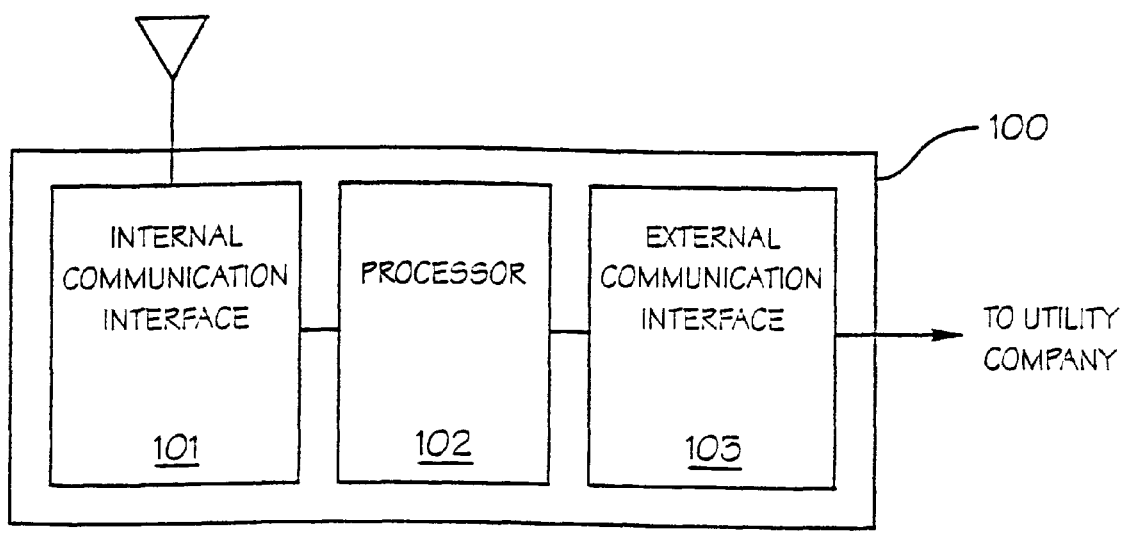
FIG. 2 of the drawings is a schematic block diagram of a multi-unit automation system controller.

As shown in FIG. 2 of the drawings, multi-unit automation system controller 100 includes internal communication interface 101, processor 102, and external communication interface 103. Multi-unit automation system controller 100 may include further sub-systems, such as volatile and non-volatile memory, power supplies and the like, as would be known to those of ordinary skill in the art.

Internal communication interface 101 communicates with each of the self-contained automation system controllers (such as reference 15) associated with the plurality of units. Preferably communication interface 101 facilitates communication between multi-unit automation system controller 100 and its unit controllers via a radio frequency link. By using a radio frequency, the initial cost of installing an automated multi-unit structure using the appliance interface modules ("AIMs") and automated system control is reduced, thereby encouraging adoption of such systems. In new construction, communication according to a standard like CEBus, WHISPER or other automation standard can be done via twisted pair, coaxial cable, power line or radio frequency communications. Audio/video bus communications and fiber optics communications standards which are currently being developed in the industry, are also contemplated as being used in connection with the present invention.

As shown in FIG. 2, communication interface 101 can communicate with one of the plurality of unit controllers at a time. Accordingly, communication between the various units and central controller 100 is facilitated using a time-slotted protocol assigned by controller 100. However, as would be known to those of ordinary skill in the art, it is possible to configure communication interface 101 such that it can simultaneously receive and/or transmit to two or more self-contained automated system controllers Nevertheless, as the number of units that can be controlled by a single central controller could number in the hundreds, it is contemplated that some time-slotted protocol would still be required even in a simultaneous reception/transmission embodiment.

In a preferred embodiment, the present invention utilizes a spread-spectrum communication technique in the 900 Mhz transmission range. While this technique provides various benefits such as lower power requirements and additional security, use of spread-spectrum technology is not necessary to practice a radio frequency embodiment of the present invention.

Figure 3:
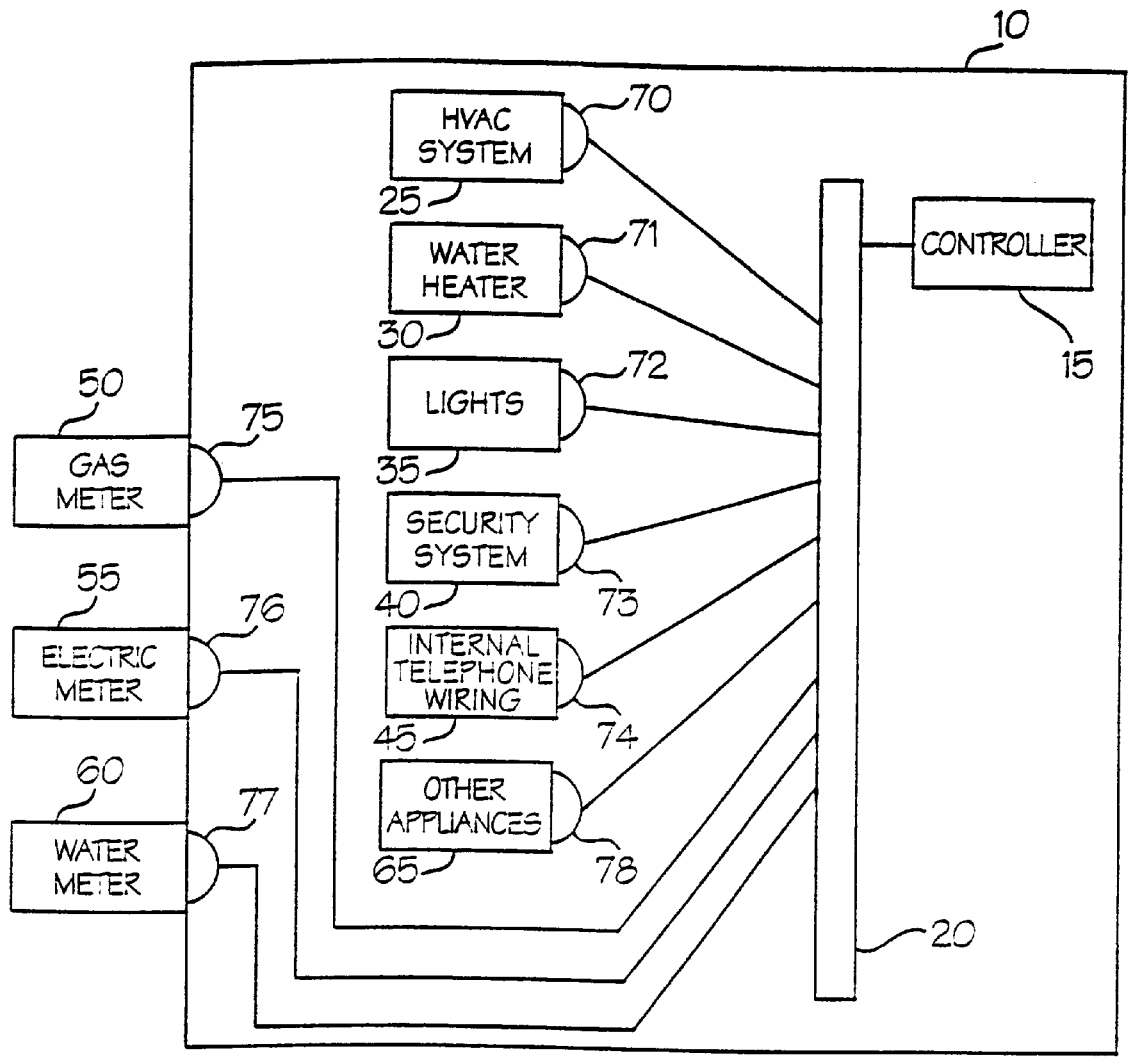
FIG. 3 of the drawings is a block diagram of a single unit of the multi-unit structure of FIG. 1, including various appliances and mechanical systems associated with that particular single unit.

Unit 10 of the plurality of units of multi-unit structure 5 containing a self-contained automation control system is shown in FIG. 3 of the drawings. Of course, the other units would contain similar systems to that associated with unit 10, with each unit system being substantially separate from each other unit system. All such unit systems would be linked to central controller 100 as described above.

Each unit system includes unit controller 15, which is connected, for example—via residential electrical wiring system 20 within unit 10—to HVAC system 25, water heater 30, lights 35, security system 40, internal telephone wiring system 45, gas meter 50, electric meter 55, water meter 60, or other appliances 65 (such as a hot tub, clothes dryer, etc.). These connections are achieved by appliance interface modules (AIMs), which are disclosed in the co-pending application, and indicated by reference numbers 70 through 78.

There are various AIM configurations. AIMs can be attached to both electric-only and gas-operated appliances in various manners that are not pertinent to the present invention. Additionally, some AIMs may contain non-volatile memory, so as to store module addresses and other information and maintain such information even through power failures. Some AIMs are configured solely to monitor appliance operation, others also control appliance operation and still others can actually override built-in electronic or mechanical control for their associated appliance (and/or override otherwise conflicting instructions received from remote sources) upon receipt of appropriate instructions from unit controller 15. Accordingly, various units of multi-unit structure 5 will have differing configurations of AIMs and associated appliances.

Figure 4:
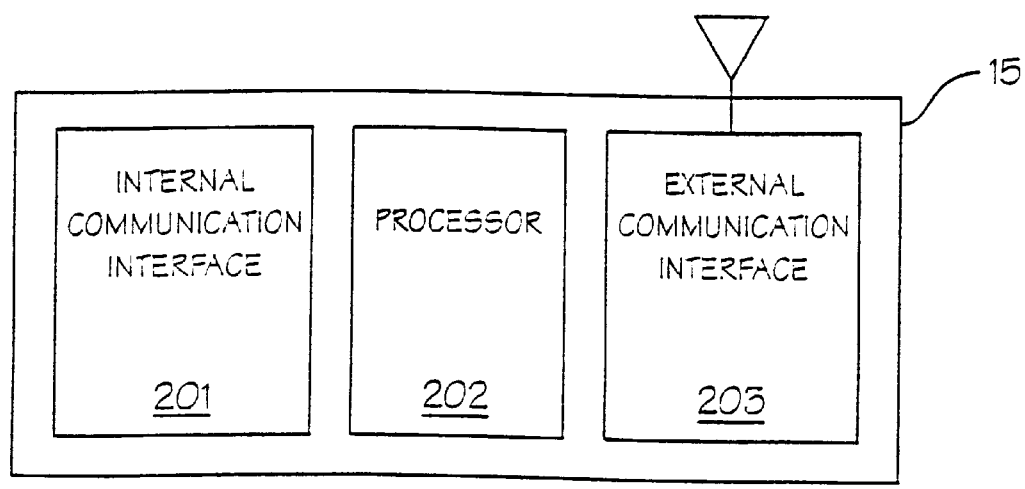
FIG. 4 of the drawings is a schematic block diagram of the unit controller of the unit disclosed in FIG. 3 of the drawings.

As shown in FIG. 4 of the drawings, unit controller 15 includes appliance communications interface 200, processor 201, and external communication interface 202. Appliance communications interface 200 and processor 201 are directed toward communicating with, controlling, and obtaining data from various ones of the AIMs disposed within the associated unit of multi-unit structure 5. These aspects of the present system are fully disclosed within co-pending application Ser. No. 08/375,481 and will not be revisited here. External communication interface 202 handles communication between central controller 100 and unit controller 15. As discussed above, in a preferred embodiment, this interface is a spread-spectrum radio frequency link. However, other embodiments using alternate modes of communication are additionally contemplated, particularly for new construction of multi-unit structures.

In a preferred embodiment, communication between external communication interface 20 and central controller 100 occur in packets transmitted over the RF link. As noted, in this embodiment, a spread spectrum technique is used whereby each packet is transmitted on a pseudo-randomly selected one of a plurality of frequencies. Following the transmission/reception of a packet sent between the external communication interface 20 and central controller 100, the units synchronously change their transmission frequencies to another of the plurality of frequencies, as is generally known in the art. In particular, the present invention utilizes a table with various pseudo-random sequences from which the central and unit controllers select their hopping sequence.

As a new unit controller is brought into service it will be unknown to central controller 100. Similarly, a unit controller may also fall out of sync with central controller 100. Accordingly, external communication interface 103 of central controller 100 selects an idle channel by listening on a channel and monitoring the Received Signal Strength Indicator (RSSI) for that channel. If the RSSI is lower than a predetermined threshold value then the channel is idle. Otherwise a new channel is selected and the process continues until an idle channel is found. Once found, central controller 100 transmits a synchronization signal for an extended period of time, such as 60 minutes, to allow various unit controllers to synchronize to the central controller.

Upon locating the central controller's signal, the unit controller transmits a packet indicating the table-sequence being used by that unit controller and the unit's next frequency selection within that sequence on which the unit controller will "come up on" after it is assigned a time slot by central controller 100. Of course, once synchronized the unit and central controllers communicate at an assigned time slot, until synchronization is lost or transmission quality is too low. Generally, however, external communication interface 103 spends much of its time locating and scheduling new unit controllers.

The transmission packets used in a preferred embodiment are shown in FIGS. 5 and 6. In particular, the packet of FIG. 5 is used during acquisition of synchronization and the packet of FIG. 6 during normal communication. Each packet includes a preamble; "SPC" [Charles: what is this?]; message priority indicator ("CTRL"); the unique base address of central controller 100; the unique address of the unit controller involved with the present communication; a data length field ("LEN"); data comprising (i) for the acquisition packet, the location within the hopping sequence ("HOP SEQ") or (ii) for the communication packet, data associated with a command; and an error-detecting code ("CHK SUM").

Each preamble is suited to its particular function. For instance, the acquisition preamble is longer than the normal preamble thus increasing the potential for detection of the packet by the central controller so as to facilitate earliest synchronization. Otherwise, the preambles may be virtually identical.

In a preferred embodiment, the message priority indicator can support normal, priority and special messages. A priority message is acted upon quicker in central controller 100. A special message occurs whenever unit controller 15 transmits outside of its regularly scheduled time-slot. Such transmission may occur on the occurrence of a hazardous condition or alarm situation.

While various commands may be transmitted, a few include: change data reporting intervals; change scheduling time; forced frequency hop; enter sleep mode; reset demand data; reset dial value; shed load; connect load; and report data, among other commands. Each command includes, in addition to the command-type, the device type (gas meter, water meter, water heater, flow station, etc.).

The error-detecting code preferably comprises a "Flecher's Checksum." However, other error-detecting codes are known within the art that are similarly suitable for this application, such as a standard checksum, cyclic redundancy checking, etc. Of course, it would also be possible to provide an error-correcting code, so long as the system can facilitate the substantial overhead created thereby.

The external communication interface 203 of unit controller 15 may report data only if there was a value change, However, to facilitate a "handshaking" protocol used to ensure receipt of the various transmissions, the unit will still provide an abbreviated response to central controller 100. This abbreviated response will conserve power—particularly significant if the radio is battery-powered—as well as minimize the time required for transmission and any resulting radio interface caused by the transmission.

In a preferred embodiment, external communication interface 203 of unit controller 15 may further include volatile memory for the storage of data transmitted by unit controller 15 to central controller 100. Alternatively, external communication interface 203 could continue to send a data packet until the unit controller is assured of proper receipt. However, in a preferred embodiment, the transmitted data is saved in case of data loss during transmission at least until an acknowledgment is received from central controller 100. Failure to receive a return acknowledgment signal from central controller 100 (or a unit controller) can be due to any number of environmental and electrical factors. Accordingly, the external communication interface stores data along with the time from an internal timestamp counter. In one embodiment of the present invention, the internal timestamp counter utilizes a realtime clock. Inasmuch as time in seconds must be kept by each AIM, unit controller and central controller to facilitate the time division multiplexing used in the preferred embodiment, the use of a realtime clock requires only conversion from seconds to hours:minutes:seconds. Another embodiment would simply use a timestamp counter that is based on the seconds maintained by units, thus, avoiding the overhead associated with a real-time clock. However, the value of the timestamp counter must be continually verified and, if necessary, corrected by the central controller 100, so as to facilitate synchronization of the logged data in kept real time by central controller 100 and the various utilities in the event that data transmission is required from the log. Of course, this verification and correction also facilitates time-division multiplexing.

Processor 102 of central controller 100 is a programmable processing device capable of a variety of operations. Normally associated with processor 102 is volatile and non-volatile memory to facilitate the various functions of central controller 100. These functions are related to the foregoing operations described with respect to facilitating communication between central controller 100 and the plurality of units.

Additionally, processor 102 must be configured and/or programmed to process the various data transmitted from each of the plurality of units in multi-unit structure 5, as well as the data transmitted by the utilities via external communication interface 103. For instance, via any and all of the unit controllers, central controller 100 will receive information either directly or extrapolated from the various AIMs disposed in the various spaces. For example, where each unit has its own gas furnace, those associated AIMs: 1) monitor instantaneous and total natural or LP gas usage and electric usage of the furnace (and air conditioner); 2) provide inputs for setting nominal firing rates for the burner and power consumption of electrical devices, such as a compressor, during installation, so as to enable reporting of gas and electric power consumption during operation; 3) monitor supply air and return air temperatures (from suitably placed temperature sensors within the furnace); 4) have input ports for receiving data from externally placed sensors, such as temperature sensors in individual rooms for actual room temperature sensing; 5) have input ports for receiving remote commands for heating, raising or lowering of set points for heating and cooling, etc., from remote sensors or full-function thermostats, remote automation controllers or other devices; 6) monitor and report, to the automation system controller, the status of a pilot flame, gas burner, stack damper, induced draft blower, circulating blower, etc.; and 7) monitor and report, to the automation system controller, failures such as blocked stack, clogged filter, pilot or main burner failure, compressor failure or failure of the AIM itself. Similarly, the units may contain AIMs that monitor values, such as, burner ignition, temperature, and electric usage. Based on these pieces of information, central controller 100 can obtain a picture of the condition of multi-unit structure 5.

Thus, the central controller puts building owners in a position to acquire much more accurate and detailed information regarding patterns of power usage, incidence of usage of failing or inefficient equipment and the like, which would assist the owner in setting rents, planning appliance upgrades and repairing various related aspects of the structure that directly affect power-usage.

An example of the foregoing might be that the residence's gas consumption data might appear to be inconsistent with the gas usage data from other similarly situated units. This may indicate a faulty furnace, water heater and other gas appliances. This data may alternatively indicate poor thermal insulation or a resident overheating the unit. Of course, with further information about the furnace and water heater performance, and temperature data, which can be similarly compared with like appliances in other units, the reason for the aberration can be determined.

This information can be used to protect tenants and the structure from potential appliance malfunction. Further, a cost savings may be achieved by reducing the amount of time, labor and effort involved in gathering data and locating faulty appliances for replacement, thus, leading to earlier replacement and saved utility costs.

The control aspects provided by central controller 100 via each of the unit controllers also provide significant cost benefits. For instance, if the building personnel know that a unit is vacant, they can control the environment of that unit to reflect the vacancy and, thus, save on certain utility expenses. One example of this is a residence hall during a vacation period.

As shown in FIG. 2 of the drawings, central controller 100 further includes external communication interface 103. External communication interface 103 facilitates communication between central controller 100 and various utility companies. In one embodiment, external communication interface 103 may comprise a modem configured to communicate with one or more utility companies via a standard telephone line. In another embodiment, external communication interface 103 may comprise an RF transmitter/receiver unit configured to communicate with one or more utility companies. In yet another embodiment, external communication interface 103 may comprise a cable TV system interface. The connection through external communication interface 103 from the utility to processor 102 is intended to be complete so as to permit the transmission of inquiries and/or data to or from the utility to be passed through from or to the system at all times.

To facilitate communication with the utilities, each central controller 100 and multi-structure unit 5 is assigned a unique address. Accordingly, external communication interface 103 performs a gate-keeping function by allowing only messages intended for the associated controller 100 to be passed thereto. Further, external communication interface 103 also ensures transmission to the utility.

Connection of the various units to central controller 100 permits various advantageous cost and effort-saving functions to be possible. For example, the building personnel will be able to monitor individual unit usages throughout multi-unit structure 5. Accordingly, if there are any aberrations, such as abnormally high gas usage, this may indicate various correctable problems that might otherwise go unnoticed. Furthermore, if the AIMs in the units are suitably programmed and installed, building personnel may even undertake some limited override control of the operation of the appliances and mechanical systems of one or more units. For instance, in a residence hall, the heat could be lowered in one or more units during vacation periods.

Additionally, the connection maintained with the utility companies may lead to further potential control situations. For instance, if the utility were to perceive that a potential power shortage ("brownout") were developing, or that there were a dangerous gas pressure instability occurring, the utility could then communicate with central controller 100, which, in turn, would communicate with the unit controllers associated with the various units toward ultimately shutting (or slowing) down various appliances.

An example of the foregoing would be if the utility were to detect a "brownout" situation developing. In an electric heated multi-unit structure, the utility would communicate to central controller 100, which can reduce (or raise, as may be appropriate) the temperature setpoints for various ones of the plurality of units depending upon some user-definable protocol. Monitoring of the operation of such appliances as the furnace would be accomplished by taking data on the return and exit air temperatures, and performing interpolations, according to techniques known in the art, to approximate the residence space temperatures.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

What is claimed is:

1. A multi-unit automated space management and communication system for use in association with a structure having a plurality of units, said system comprising:

means for monitoring various utility related aspects of each of the plurality of units;

an automated subsystem disposed in each one of the plurality of units, said subsystem including at least one appliance apparatus disposed in the unit, at least one communication medium means operably disposed in the unit, at least one interface means for connecting the at least one appliance apparatus into a signal exchanging relationship with the at least one communication medium means, at least one communication source, operably connected to the at least one communication medium means, for generating at least one first signal relevant to at least one of the at least one appliance apparatus, the at least one communication source being capable of disposing the at least one first signal into the at least one communication medium means, for reception at least one location remote from the communication source, the at least one interface means being operably configured so as to enable at least one of the at least one appliance apparatus to respond to the at least one first signal relevant to the at least one of the at least one appliance apparatus for transmission to locations remote from the at least one appliance apparatus, the at least one interface means being further operably configured so as to be capable of generating at least one second signal representative of at least one characteristic of the at least one appliance apparatus, the at least one interface means further being operably configured so as to be capable of disposing the at least one second signal into the at least one communication medium means, for reception at at least one location remote from the at least one interface means;

an external communication interface linking the automated subsystem in each one of the plurality of units to the monitoring means in a signal-exchanging relationship; and means for storing data provided from each one of the plurality of automated subsystems associated with each one of the plurality of units.

2. The system of claim 1 further comprising means for controlling one or more of the at least one appliance apparatus disposed in at least one of the plurality of units.

3. The system of claim 2 further comprising means for receiving commands from a utility company associated with the controlling means.

4. The system of claim 2 further comprising a user-interface that allows the user to access the data in the storing means.

5. The system of claim 4 further comprising means for receiving commands from a local user associated with the controlling means.

6. The system of claim 1 further comprising a user-interface that allows the user to access the data in the storing means.

7. The system of claim 1 wherein the external communication interface includes:

plurality of remote radio frequency transmitter/receivers in each one of the plurality of units associated with each automated subsystem, each one of the plurality of remote radio frequency transmitter/receivers having a current transmission-reception frequency; and a central radio frequency transmitter/receiver associated with the monitoring and storing means, the central radio frequency transmitter/receiver having a variable transmission-reception frequency.

8. The system of claim 7 wherein the external communication interface further includes means for altering the current transmission-reception frequency in each of the plurality of remote radio frequency transmitter/receivers and the variable transmission-reception frequency in the central radio, such that the current and variable frequencies hop between two or more frequencies in synchronization.

9. The system of claim 8 wherein the external communication interface further includes means for assigning a communication time slot to each of the plurality of remote radio frequency transmitter/receiver to facilitate communication between each of the plurality of remote radio frequency transmitter/receivers and the central radio transmitter/receiver.

* * * * *